(12) United States Patent
DeFazio

(10) Patent No.: US 6,976,757 B2
(45) Date of Patent: *Dec. 20, 2005

(54) INVISIBLE MULTIFOCAL SUNGLASSES

(75) Inventor: Jeff DeFazio, El Cerrito, CA (US)

(73) Assignee: Zoom Eyeworks, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/904,173

(22) Filed: Oct. 27, 2004

(65) Prior Publication Data

US 2005/0036107 A1    Feb. 17, 2005

Related U.S. Application Data

(62) Division of application No. 10/711,756, filed on Oct. 1, 2004.

(51) Int. Cl.[7] .................... G02C 7/10; G02C 7/06
(52) U.S. Cl. .................... 351/164; 351/44; 351/166; 351/168
(58) Field of Search ............... 351/41, 44, 45, 351/159, 164, 166, 168

(56) References Cited

U.S. PATENT DOCUMENTS

| | | | | |
|---|---|---|---|---|
| 3,958,867 A | | 5/1976 | Morgan | 351/47 |
| 5,408,278 A | * | 4/1995 | Christman | 351/44 |
| 5,478,824 A | | 12/1995 | Burns | 351/172 |
| 5,682,220 A | | 10/1997 | Sherman | 351/45 |
| 5,790,227 A | | 8/1998 | Rorabaugh | 351/55 |
| 5,793,467 A | | 8/1998 | Bailey | 351/172 |
| 5,928,718 A | * | 7/1999 | Dillon | 427/164 |
| 6,155,681 A | * | 12/2000 | Kris et al. | 351/169 |
| 6,170,952 B1 | | 1/2001 | La Haye | 351/168 |
| 6,726,320 B1 | * | 4/2004 | Mullin et al. | 351/44 |
| 2004/0046927 A1 | | 3/2004 | Montgomery | 351/46 |

* cited by examiner

*Primary Examiner*—Scott J. Sugarman
*Assistant Examiner*—Darryl J. Collins
(74) *Attorney, Agent, or Firm*—Glenn L. Webb

(57) ABSTRACT

Invisible bifocal sunglasses. The sunglasses include a hard mirror coating to disguise the different focal powers of the sunglasses. The bifocal sunglasses also include a bifocal region that is molded within the main lens blank of the sunglasses.

20 Claims, 2 Drawing Sheets

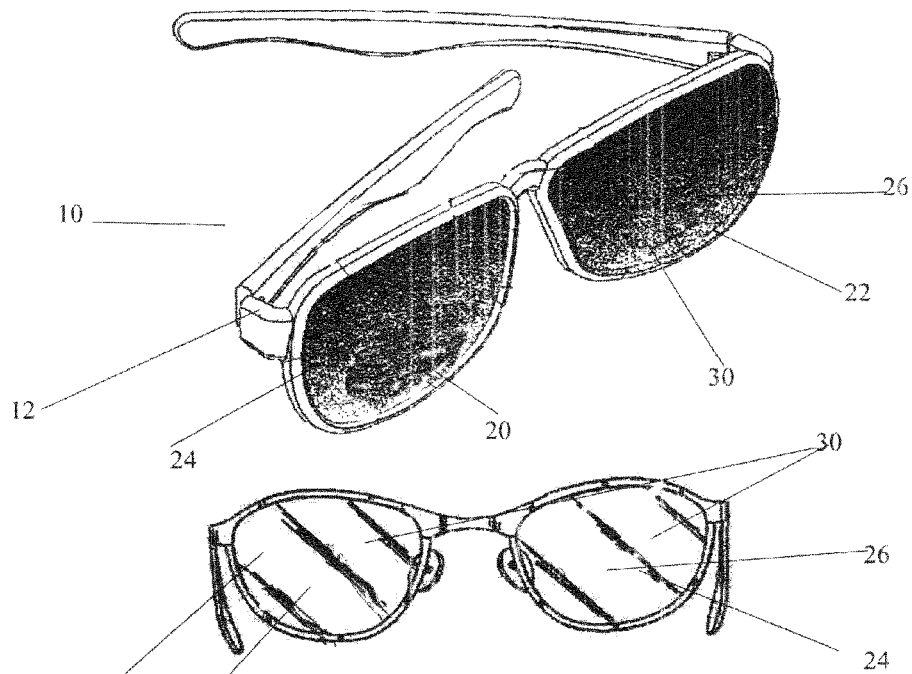
Figure 1
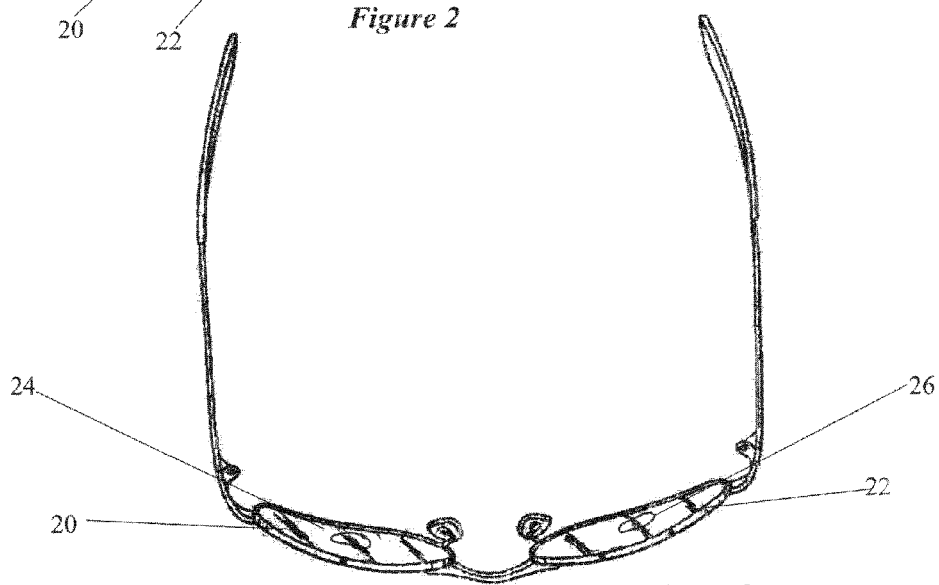
Figure 2
Figure 3

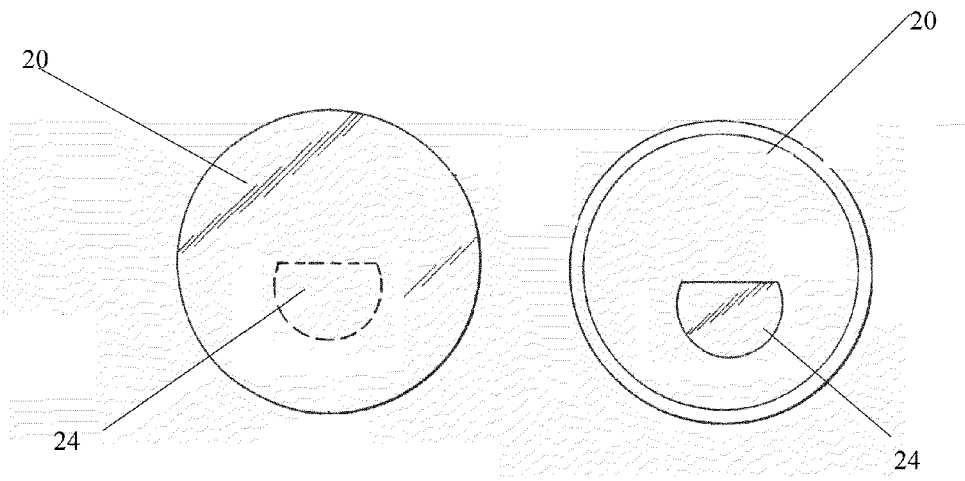
Figure 4
Figure 5
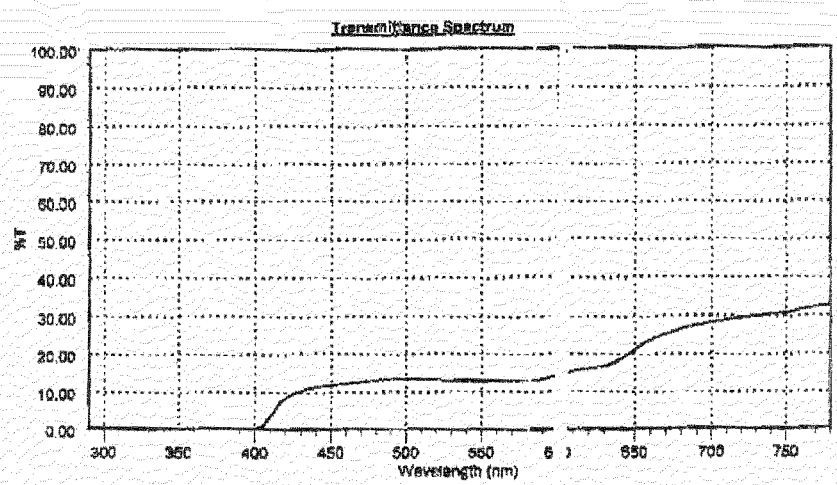
Figure 6

INVISIBLE MULTIFOCAL SUNGLASSES

RELATED APPLICATIONS

This application is a divisional of Ser. No. 10/711,756, filed on Oct. 1, 2004, pending.

FIELD OF THE INVENTION

This invention relates to the field of multifocal sunglasses and particularly to bifocal sunglasses having a non-magnified portion and a non-prescription magnified portion.

BACKGROUND OF THE INVENTION

Sunglasses are widely recommended and used when individuals are in direct or indirect sunlight. The protective effect provided by sunglasses is important to mitigate the health risks associated with overexposure of the eyes to sunlight, particularly the ultraviolet (UV) component thereof. It is well known that overexposure to ultraviolet radiation from the sun can cause or exacerbate cataracts, for example.

Another problem arises due to the glare from direct or reflected sunshine with most outdoor activities. Sunglasses are critical in minimizing glare from sunlight or reflected surfaces. Driving, boating, flying or just general activities in bright sunlight often cannot be safely performed without sunglasses.

Another feature that is typical of many wearers of sunglasses is the stylistic or aesthetic look of the sunglasses. Sunglasses are often considered a fashion accessory as well as utilitarian item. Thus, the style of the sunglasses may be as important as the relevant health mitigation that the sunglasses may provide.

Prescription sunglasses are often worn by people who have deficiencies in their vision. Many people suffer from eye problems, such as myopia, presbyopia or astigmatism that require corrective eyewear. Often, the corrective eyewear is incorporated into sunglasses. Such prescription sunglasses provide not only the health benefits from overexposure to sunlight, but also correct the eyesight of the wearer.

However, a problem often arises with people who may want to read or perform activities that require a change in their prescriptive eyewear. Many people have differing corrective vision requirements for far distance and near distance viewing. Often, multifocal eyewear lenses are provided for this need. Multifocal eyewear lenses are defined as lenses that include two or more regions or lens portions and where at least one of those regions has a magnified focal power. Multifocal lenses include bifocal lenses where at least one portion is magnified and the other portion has a differing focal power such as piano (non-magnified) or else magnified or otherwise adjusted to corrective the wearer's vision. Multifocal lenses may also include trifocal, progressive addition or any other type of eyewear lenses that has at least one portion that is intended for corrective vision purposes.

Bifocal eyewear provides a region in the upper and/or central region of the eyeglasses that is either piano or has a corrective focal power for far distance viewing and a lower region having a magnified focal power for near viewing needs. Other types of multifocal lenses may be used for other vision requirements, such as trifocal lenses. Another lens type is for people that suffer only from presbyopia. Presbyopia is the inability of the eye to focus at objects up close, generally within 36 inches. This individual has a choice of using a single magnification throughout the entire lens that allows them to read close up or have a bifocal at the bottom of the lens coupled with a non magnified upper area (called piano) of the lens. These glasses are called reading glasses and do not require prescriptions.

While this is more than adequate for indoor and night use, there is often a need for multifocal eyewear in direct sunlight. For example, many people enjoy reading or other activities that require near vision while on the beach or otherwise outdoors. Another example for such needs includes outdoor equipment operators, such as boating, that requires viewing of displays, maps and other near vision requirements while requiring non magnified (piano) far vision viewing for the full operation of the equipment.

One solution in satisfying this need is people may use a clip-on sunglass over the top of their existing bifocals or full lens reading glasses. Problems arise with the use of clip-on sunglasses however. It requires a separate purchase and clip-on's are not readily available in the style of the glasses they need to work with. Another problem is the attachment mechanism of the clip-on sunglasses to the bifocal eyewear. These attachment mechanisms tend to easily become disengaged at inopportune times. Another problem is that the eyewear becomes top heavy, unbalanced and cumbersome. Yet another problem is that the clip-on sunglasses destroy the aesthetic appeal of the eyewear.

There have been some attempts in the past to provide bifocal sunglasses. These attempts have created a relatively unattractive design. The bifocal sunglasses are readily evident by casual observation by the line of demarcation between the differing focal regions. Since sunglasses tend to be selected for stylistic reasons first and then health reasons, sunglasses with bifocals have not been popular in the past. Also, many people prefer that their vision deficiencies not be readily noticeable.

Previous bifocal sunglasses have a three-dimensional appearance. This look is due to the addition of a bifocal lens adhered either onto the inner surface or the outer surface of the sunglasses. These bifocal sunglasses are easily noticeable to the casual observer. As such, these sunglasses are undesirable to most individuals.

Thus the need exists for multifocal sunglasses that are not distinguishable from other sunglasses and particularly for bifocal sunglass lenses which have a magnified portion on the bottom with a non-magnified lens on top.

SUMMARY OF THE INVENTION

The present invention provides a solution for these and other problems by providing sunglasses that substantially disguise the focal power of non-prescriptive bifocal sunglasses. In the preferred embodiment, even multifocal sunglasses are essentially indistinguishable to a casual observer.

A preferred embodiment of the present invention provides a pair of sunglasses that have non-prescriptive lenses with a magnified lens portion to correct deficient presbyopic eyesight. The sunglasses include a light transmittance blocking mechanism, such as dye pigmentation or an ultraviolet coating. The sunglasses also include a flash mirror coating to disguise the non-prescriptive bifocal nature of the lenses.

Another preferred embodiment of the present invention provides a unique multifocal lens that incorporates lens of differing focal powers within an outer lens. This minimizes the appearance of the differing focal powers in the eyewear, particularly in sunglasses.

The present invention, in another preferred embodiment, uses the combination of the lens within a lens multifocal lens with the flash mirror coating to disguise the appearance of multifocal sunglasses.

The present invention also provides in a preferred embodiment a relatively thin, high strength acrylic or polycarbonate lens for use as non-prescriptive bifocal sunglasses. The thin plastic acrylic or polycarbonate lenses are coated with a hard metallic coating to provide additional strength to the lens.

The multifocal sunglasses are, in a preferred embodiment, manufactured by a unique manufacturing process that simultaneously injection molds in an inner focal power lens blank and an outer piano lens blank. Each different focal power of lens uses a unique mold. These lens blanks are then dyed with light transmittance blocking pigmentation. The dyed lenses are then coated with a light flash mirror coating in a vacuum coating machine. This metallic coating provides not only additional strength to the lens but also disguises the inner focal power of the lenses.

The multifocal sunglasses are then essentially indistinguishable from all other sunglasses by casual observance. The metallic coating may be used with single focal as well as multifocal lenses manufactured by other processes as well. These non-prescriptive bifocal sunglasses with this coating process may be manufactured as thinner lenses as the coating provides additional strength to the lenses as well as providing a durable coating.

These and other features of the present invention will be evident from the ensuing description of preferred embodiments and from the drawings.

BRIEF DESCRIPTION OF THE DRAWINGS

FIG. 1 is a perspective view of an example of the multifocal sunglasses of a preferred embodiment of the present invention.

FIG. 2 is a front view of the multifocal sunglasses of a preferred embodiment of the present invention.

FIG. 3 is a top view showing the inner surface of the lenses of the multifocal sunglasses of the embodiment of FIG. 2.

FIG. 4 is front view of a lens blank manufactured under a preferred embodiment of the present invention.

FIG. 5 is a rear view of the lens blank of FIG. 4.

FIG. 6 is a chart of the light transmittance of the preferred embodiment of the present invention.

DETAILED DESCRIPTION OF PREFERRED EMBODIMENTS OF THE INVENTION

The present invention, in a preferred embodiment, provides improved aesthetics of nonprescription bifocal sunglasses. A preferred embodiment of the present invention is described below. It is to be expressly understood that this descriptive embodiment is provided for explanatory purposes only, and is not meant to unduly limit the scope of the present invention as set forth in the claims. Other embodiments of the present invention are considered to be within the scope of the claimed inventions, including not only those embodiments that would be within the scope of one skilled in the art, but also as encompassed in technology developed in the future.

The present invention is described herein as bifocal eyewear. It is to be expressly understood that other types of eyewear may be used as well, including single focal eyewear, trifocal eyewear, progressive addition lenses, other multifocal lenses, and any other types of eyewear, prescriptive and non-prescriptive. Multifocal eyewear lenses are defined for purposes of this application as lenses that include two or more regions or lens portions and where at least one of those regions has a magnified focal power. Multifocal lenses include bifocal lenses where at least one portion is magnified and the other portion has a differing focal power such as piano (non-magnified) or else magnified or otherwise adjusted to correct the wearer's vision. The magnified portion may be prescription or non-prescription. Multifocal lenses may also include trifocal, progressive addition or any other type of eyewear lenses that has at least one portion that is intended for corrective vision purposes.

A preferred embodiment of the present invention is illustrated in FIGS. 1–3. Prescription bifocal sunglasses 10 include frame 12 and lenses 20, 22. For purposes of this invention, the frames 12 are not a critical component of the invention. Any frame that is compatible for use with eyewear is considered to be within the scope of the claimed invention.

This preferred embodiment includes bifocal lenses 24, 26 incorporated into the lenses 20, 22, respectively. The lenses 20, 22 in this preferred embodiment are piano lenses, that is non-magnified. The bifocal lenses 24, 26 in this preferred embodiment are non-prescription magnified lenses. It is to be expressly understood that other types of lenses may be included in the present invention as well, including lenses have two or more regions of differing focal powers, including prescription lenses.

The above described bifocal lenses 24, 26 are incorporated directly into the lenses 20, 22 through a process described in greater detail below. The lenses are treated with a dye coating to limit the light transmittance as described in greater detail below. Preferably, the light transmittance is between the range of about ten to forty percent, although the specific range of between twelve to fifteen percent is preferable. The range may also be expanded as necessary to accommodate specialty uses.

This preferred embodiment also includes a flash mirror coating 30 on the exterior of the lenses. The flash mirror coating provides a durable finish over the lenses that also minimizes the appearance of the bifocal lenses 24, 26 relative to the lenses 20, 22.

The combination of the flash mirror coating 30 over the lenses 20, 22, 24, 26 and the incorporation of the bifocal lenses 24, 26 into the lenses 20, 22 render the appearance of the differing focal lenses nearly invisible. The sunglass lenses will appear to be simply non-prescriptive non-magnified sunglasses to the casual observer. It is nearly impossible to discern that the eyewear is multifocal or even bifocal eyewear without careful inspection.

PREFERRED EMBODIMENT OF THE MULTIFOCAL LENS MANUFACTURING PROCESS

In this preferred embodiment, the lenses 20, 22 are precision molded from plastic resins. These plastic resins may include CR-39, a well known plastic eyeglass lens material, polycarbonate, Zyl resin, or any other suitable material. In this preferred embodiment, the preferred material is acrylic. These plastic resins are heated and injected into molds. The lens blanks that are formed from the molding process are at this point clear lenses. The lens blanks are then cooled, and inspected for scratches, dents and other molding impurities.

The multifocal lenses 20, 22, 24, 26 are formed in a unique molding process in a preferred embodiment of the present invention. The molding process utilizes an inner mold within the outer lens blank mold. The inner mold creates the bifocal powered focal lens 24, 26 within the lens blanks 20, 22. Different focal powers for the bifocal lens 24, 26 are created by different inner molds. In operation, the outer mold creates the lens 20, 22 in an injection molding operation. Simultaneously with the molding of the outer lenses 20, 22, an inner mold contained within the outer mold also is injected with the plastic resins. A different mold is used for each different focal power of lens that is manufactured, both for the outer lens and for the inner lens.

The bifocal or multifocal lenses are contained largely within the lenses 20, 22 as shown in FIG. 4 and 5. This minimizes the appearance of the differing focal regions of the multifocal lenses. The difference in the focal powers to the extent that it is noticeable is primarily noticeable on the inner surface of the lenses. Previous multifocal lenses typically included a line of demarcation between the lenses that clearly indicated that these were multifocal eyewear. Even progressive multifocal lenses that blend the regions of differing focal power to eliminate this line still are clearly noticeable as multifocal eyewear. Adding light transmittance blocking pigmentation or coatings fail to minimize this appearance of the previous multifocal eyewear.

It is to be expressly understood that other types of manufacturing multifocal lenses are considered to be within the scope of the presently claimed invention. For example, the multifocal lenses may be created by grinding different regions of the lens to different powers, by adhering different layers of optic glass or plastic to one another, by thermal vacuum forming where a glass or plastic blank is positioned onto a platform within a furnace to form the lens and bifocal region either by vacuum or by gravity or by any other type of manufacturing process currently utilized or later developed.

Once the lens blanks have been manufactured, they are inspected for scratches, dents and for other impurities or defects that may have occurred during the molding process.

The accepted lens blanks are then dyed with pigments to block light transmittance within acceptable limits. The overall light transmittance in the preferred embodiment ranges within about ten percent to about forty percent as shown in FIG. 4. In the preferred embodiment, the preferred transmittance is about twelve to fifteen percent for outdoor use and to block UV400 rays including UVA and UVB light. Other ranges can be specified for other uses if necessary. Also, other dye pigmentation may be used to provide uses for different environments. For example, it may be useful to provide light transmittance of certain wavelengths while blocking other wavelengths for low light use, reflected light, polarization or any other desired uses.

The dyed lens blanks are then treated with a hard metallic coating. A number of different metallic coatings may be used. In the preferred embodiment, the lens blanks are coated with chromium. In this preferred embodiment, the lens blanks are coated in a vacuum coating machine with a light flash mirror coating.

The coating provides a number of benefits. Among these benefits is the added strengthening of the lens blank. This allows a thinner lens blank to be manufactured which improves the aesthetic styling of the sunglasses. The preferred acrylic material of the lens blank is relatively thin when used in eyewear. The metallic coating provides additional strength to allow a thin lens to be manufactured even for relatively strong focal powers.

The metallic coating of the preferred embodiment also provides a flash mirror coating to the external surface of the lenses. This flash mirror coating disguises the different focal regions of the lenses as well as the look of prescriptive eyewear. The preferred embodiment of the present invention utilizes this flash mirror coating with the bifocal lens molded within the outer lens to provide essentially invisible multifocal sunglasses. In this embodiment, the bifocal lens 24 is only noticeable from the inner surface of the eyewear, and then only upon close inspection.

It is to be expressly understood that this flash mirror coating process may be used with multifocal lenses manufactured by other techniques as well.

Once the lens blanks have been coated with the light flash mirror coating, the lens blanks are tested for ultraviolet transmission. The acceptable lens blanks can then be edged and cut to an appropriate size to fit into specified frames. The lenses can then be inserted into frames with the specified pupillary distance for a wearer.

It is to be expressly understood that the above described embodiments are provided for explanatory purposes only. Other embodiments are considered to be within the scope of the present invention as claimed.

What is claimed is:

1. A lens assembly for sunglasses, said lens assembly comprising:
   a first lens having a first focal power to correct the vision of a user;
   a second lens having a differing focal power than said first lens;
   said first lens is molded into said second lens;
   a coating on said first lens and said second lens for disguising the differing focal power of said first lens and said second lens to an observer;
   a dye pigmentation for blocking light transmission through said lens assembly.

2. The lens assembly of claim 1 wherein said coating further includes:
   providing additional strength to said lens assembly.

3. The lens assembly of claim 1 wherein said coating includes:
   chemicals having chromium as one ingredient.

4. The lens assembly of claim 1 wherein said first lens including:
   focal power objects to improve visual acuity; and
   said coating disguises said focal power objects on said first lens to an observer.

5. The lens assembly of claim 1 wherein said dye pigmentation for said lens assembly limits the light transmittance through said lens assembly approximately between ten to forty percent.

6. The lens assembly of claim 1 wherein said dye pigmentation for said lens assembly limits the light transmittance through said lens assembly to about approximately twelve to fifteen percent.

7. The lens assembly of claim 1 wherein said coating for disguising said focal power of said first lens includes:
   a hard coating on said first lens providing the appearance of a light flash mirror to disguise said the focal power of said first lens.

8. The lens assembly of claim 1 wherein said coating further includes:
   providing additional strength to said lens assembly.

9. The lens assembly of claim 1 wherein said hard coating includes:
   providing the appearance of a light flash mirror.

10. The lens assembly of claim 1 wherein said coating includes:
   chemicals having chromium as one ingredient.

11. The lens assembly of claim 1 wherein said dye pigmentation for said lens assembly limits the light transmittance through said lens assembly approximately between ten to forty percent.

12. The lens assembly of claim 1 wherein said dye pigmentation for said lens assembly limits the light transmittance through said lens assembly to about approximately twelve to fifteen percent.

13. The lens assembly of claim 1 wherein said coating for disguising said focal power of said first lens includes:
   a hard coating on said first lens providing the appearance of a light flash mirror to disguise said the focal power of said first lens.

14. A lens assembly for sunglasses, said lens assembly comprising:
   a first lens having a magnified focal power to correct the vision of a user;
   a second lens having a differing focal power than said first lens;
   said first lens is molded into said second lens;
   a coating on said first lens and said second lens for disguising the differing focal power of said first lens and said second lens to an observer; and
   a dye pigmentation for blocking light transmission through said lens assembly.

15. A lens assembly for sunglasses, said lens assembly comprising:
   a first lens having a first focal power to correct the vision of a user;
   a coating on said first lens for disguising said focal power to an observer; and
   a dye pigmentation for blocking light transmission through said lens assembly that limits the light transmittance through said lens assembly to about approximately twelve to fifteen percent.

16. The lens assembly of claim 15 wherein said coating further includes:
   providing additional strength to said lens assembly.

17. The lens assembly of claim 15 wherein said hard coating includes:
   providing the appearance of a light flash mirror.

18. The lens assembly of claim 15 wherein said coating includes:
   chemicals having chromium as one ingredient.

19. The lens assembly of claim 15 wherein said dye pigmentation for said lens assembly limits the light transmittance through said lens assembly approximately between ten to forty percent.

20. The lens assembly of claim 15 wherein said coating for disguising said focal power of said first lens includes:
   a hard coating on said first lens providing the appearance of a light flash mirror to disguise said the focal power of said first lens.

* * * * *